United States Patent
Pelley et al.

(10) Patent No.: US 7,391,792 B2
(45) Date of Patent: Jun. 24, 2008

(54) DATA MAPPER AND METHOD FOR FLEXIBLE MAPPING OF CONTROL AND DATA INFORMATION WITHIN A SONET PAYLOAD

(75) Inventors: Barry Pelley, Kinburn (CA); Germain Paul Bisson, Stittsville (CA)

(73) Assignee: Ciena Corporation, Linthicum, MD (US)

( * ) Notice: Subject to any disclaimer, the term of this patent is extended or adjusted under 35 U.S.C. 154(b) by 631 days.

(21) Appl. No.: 10/968,182

(22) Filed: Oct. 20, 2004

(65) Prior Publication Data

US 2005/0053075 A1 Mar. 10, 2005

Related U.S. Application Data

(62) Division of application No. 09/798,087, filed on Mar. 2, 2001, now Pat. No. 6,816,509.

(51) Int. Cl.
*H04J 3/06* (2006.01)
(52) U.S. Cl. .................. 370/507; 370/466; 370/509; 370/512; 370/514
(58) Field of Classification Search .......... 370/538, 370/468, 537, 476, 466, 503, 401, 465, 470, 370/509, 512, 507, 514
See application file for complete search history.

(56) References Cited

U.S. PATENT DOCUMENTS

| | | | | |
|---|---|---|---|---|
| 6,356,550 | B1 * | 3/2002 | Williams | ............ 370/364 |
| 6,452,906 | B1 | 9/2002 | Afferton et al. | |
| 6,493,847 | B1 | 12/2002 | Sorgi et al. | |
| 6,556,593 | B1 | 4/2003 | Herkersdorf et al. | |
| 6,778,561 | B1 * | 8/2004 | Jha | ............ 370/537 |
| 6,816,509 | B2 * | 11/2004 | Pelley et al. | ............ 370/466 |

(Continued)

FOREIGN PATENT DOCUMENTS

EP 0 982 969 A 3/2000

(Continued)

OTHER PUBLICATIONS

European Search report for EP 01 12 9739, dated Jul. 12, 2005, pp. 1-3.

*Primary Examiner*—Ricky Ngo
*Assistant Examiner*—DeWanda Samuel
(74) *Attorney, Agent, or Firm*—Clements Bernard Miller; Christopher L. Bernard; Tyler S. Brown

(57) ABSTRACT

A digital information mapper and method for mapping sequences of information characters into a SONET (synchronous optical network) payload in such a manner that there can be an arbitrary mixture of control and/or data values in those sequences. Each information character comprises 9 bits consisting of an 8 bit information byte, being either a control byte or a data byte, and one octet type bit identifying the byte as control or data. A processor applies a mapping algorithm of a mapping module to the input information characters. The mapping algorithm is applied to sequences of eight input information characters, the algorithm being operable to map the information bytes of each sequence of eight information characters to eight of a sequence of nine contiguous SPE octets. The algorithm then maps the octet type bits for the eight mapped information bytes of the character sequence to the ninth octet of the contiguous SPE octets of the SPE octet sequence.

12 Claims, 5 Drawing Sheets

U.S. PATENT DOCUMENTS

| | | |
|---|---|---|
| 7,002,986 B1 * | 2/2006 | Roberts .................. 370/465 |
| 7,068,679 B1 * | 6/2006 | Brown et al. ............. 370/468 |
| 2002/0085590 A1 | 7/2002 | Booth |
| 2002/0103926 A1 | 8/2002 | Cook et al. |
| 2002/0114348 A1 * | 8/2002 | McCrosky et al. ......... 370/465 |

FOREIGN PATENT DOCUMENTS

| | | |
|---|---|---|
| EP | 0982969 A2 * | 3/2000 |
| WO | WO 00/74286 A | 12/2000 |

* cited by examiner

COLUMNS

TRANSPORT O/H — STS ENVELOPE CAPACITY 1 2 3 4 5 6 ..... 90

ROWS 1–9

FIG. 3a

100 — PATH O/H

STS PAYLOAD CAPACITY

120 — FIXED STUFF

120 — FIXED STUFF 1 2 3 4 ..... 30 ..... 59 ..... 87

DATA MAPPER AND METHOD FOR FLEXIBLE MAPPING OF CONTROL AND DATA INFORMATION WITHIN A SONET PAYLOAD

This application is a Divisional of application Ser. No. 09/798,087, filed on Mar. 2, 2001 now U.S. Pat. No. 6,816,509 the entire contents of which are hereby incorporated by reference and for which priority is claimed under 35 U.S.C. § 120.

THE FIELD OF THE INVENTION

This invention relates to a data mapper and method for mapping digital information sequences into a SONET (synchronous optical network) payload in such a manner that there can be an arbitrary mixture of value types, viz. control and data, in those sequences.

BACKGROUND OF THE INVENTION

A SONET optical data signal (i.e., such as STS-48, meaning 48 synchronous transport streams) is typically composed of multiple STS-1's which are assigned to various resources or clients, with the greater the number of STS-1's representing increased bandwidth. An advantageous feature of SONET framing, which makes it particularly desirable for metro and wide area optical transport networks, is that it provides a deterministic and flexible bandwidth allocation.

Each STS-1 of a SONET frame has a frame format consisting of rows and columns of fixed numbers of octet sequences (an octet having 8 bits and being alternatively referred to as a byte) and the first few columns of octets contain transport overhead information while the remaining octets form a payload which transports user information. The payload format for a SONET frame is static and, accordingly, the known methods used for the mapping of data into a SONET frame are also static in that each octet position in the SONET frame payload is assigned a predetermined meaning between the sender and receiver of the mapped data. Because of the nature of the SONET payload format the user information which is normally mapped into a SONET frame is limited to structures having formats in which control and data type information have either fixed positions in the input and output information sequences or can be differentiated on the basis of algorithms previously applied to them such as HDLC byte stuffing.

However, many information sequence structures do not have a fixed structure and instead may contain an arbitrary or varying mixture of control and data type values. For example, this is true of packetized data such as Ethernet frames, IP datagrams, physical layer encoding schemes such as 8b10b as well as other information structures with two information types (i.e., control and data). For these information structures it can be difficult to distinguish between octets containing control information and octets containing data information and this makes it necessary to add checks to the octet sequences to ensure that these information types can be distinguished. For example, for packetized data such as Ethernet transport data, the above-mentioned mapping scheme based on HDLC byte stuffing is often used for delineating frames (i.e., marking frame boundaries so as to distinguish between two frames). This byte stuffing technique defines two control octet values, one used as a frame delimiter code, and the other to mark data codes with the same value as either control code to prevent misinterpretation. When a data code value matches either control code value, the mark data control code is inserted in front of the data code, and the data code value is adjusted.

Such methods are problematic, however, because the number of octets required, and therefore bandwidth required, to transport a data/code sequence is then determined by the data content and as many as twice the number of data structure octets may be required to carry the data structure (since, in theory, it could become necessary to mark each data code). Extending this technique to carry many different control code values, as required for transport of line codes like 8b10b would worsen this problem. The resulting loss of a deterministic bandwidth capability thereby requires additional bandwidth to be provisioned across a SONET network to provide a guaranteed quality of service.

There is a need, therefore, for means to enable a flexible mapping of data into a SONET frame by which control and data information value types need not be assigned to any fixed position in the frame and also need not be distinguished by adding extra check codes.

SUMMARY OF THE INVENTION

The present invention provides a data mapper and method for mapping digital information sequences, which may comprise variable, arbitrary mixtures of control and data value types, into a SONET frame.

In accordance with the invention there is provided a digital information mapper for mapping input information characters into a SONET frame synchronous payload envelope (SPE) wherein the information characters comprise control and/or data information and each character comprises 9 bits consisting of an 8 bit information octet, being either a control octet or a data octet, and one octet type bit identifying the octet as control or data. The mapper includes a processor and a mapping module configured for performing a mapping algorithm, wherein the mapping algorithm is applied by the processor to sequences of eight input information characters. The algorithm is operable to map the information octets of each sequence of eight information characters to eight of a sequence of nine contiguous SPE octets and to map the octet type bits for each mapped sequence of information octets to the ninth octet of the contiguous SPE octets of the SPE octet sequence.

In accordance with a further aspect of the invention there is provided a method for mapping input digital information characters into a SONET frame synchronous payload envelope (SPE). The method includes the steps of mapping the information octets for each sequence of a plurality of sequences of eight information characters to eight of a sequence of nine contiguous SPE octets and mapping the octet type bits for each mapped sequence of information octets to the ninth octet of the contiguous SPE octets of the SPE octet sequence.

Preferably, the octet type bits for a sequence of information characters are mapped to the ninth octet of the SPE sequence in such a manner that each octet type bit is mapped to the bit position of the ninth octet which corresponds to the octet position, in the SPE sequence, of the information octet with which the octet type bit is associated.

BRIEF DESCRIPTION OF THE DRAWINGS

Reference will now be made to the accompanying drawings in which like reference numerals refer to like elements throughout and which show, by way of example, a preferred embodiment of the present invention:

FIGS. 3(a) and (b) are format diagrams, FIG. 3(a) showing the full SONET STS frame format and FIG. 3(b) showing only the synchronous payload envelope format of the SONET STS frame; and, FIG. 4 is an information sequence format diagram showing a mapping of eight ESCON characters (each having 9 bits, the first 8 bits representing a value which is either a control or data value and the value of the $9^{th}$ bit identifying whether the 8-bit value is control or data type) into a sequence of nine SONET frame octets, in accordance with the invention; and, FIG. 5 is format diagram showing the mapping of octet sequences (as per FIG. 4) into a SONET payload envelope.

DETAILED DESCRIPTION OF THE ILLUSTRATED PREFERRED EMBODIMENT

Figure 1:
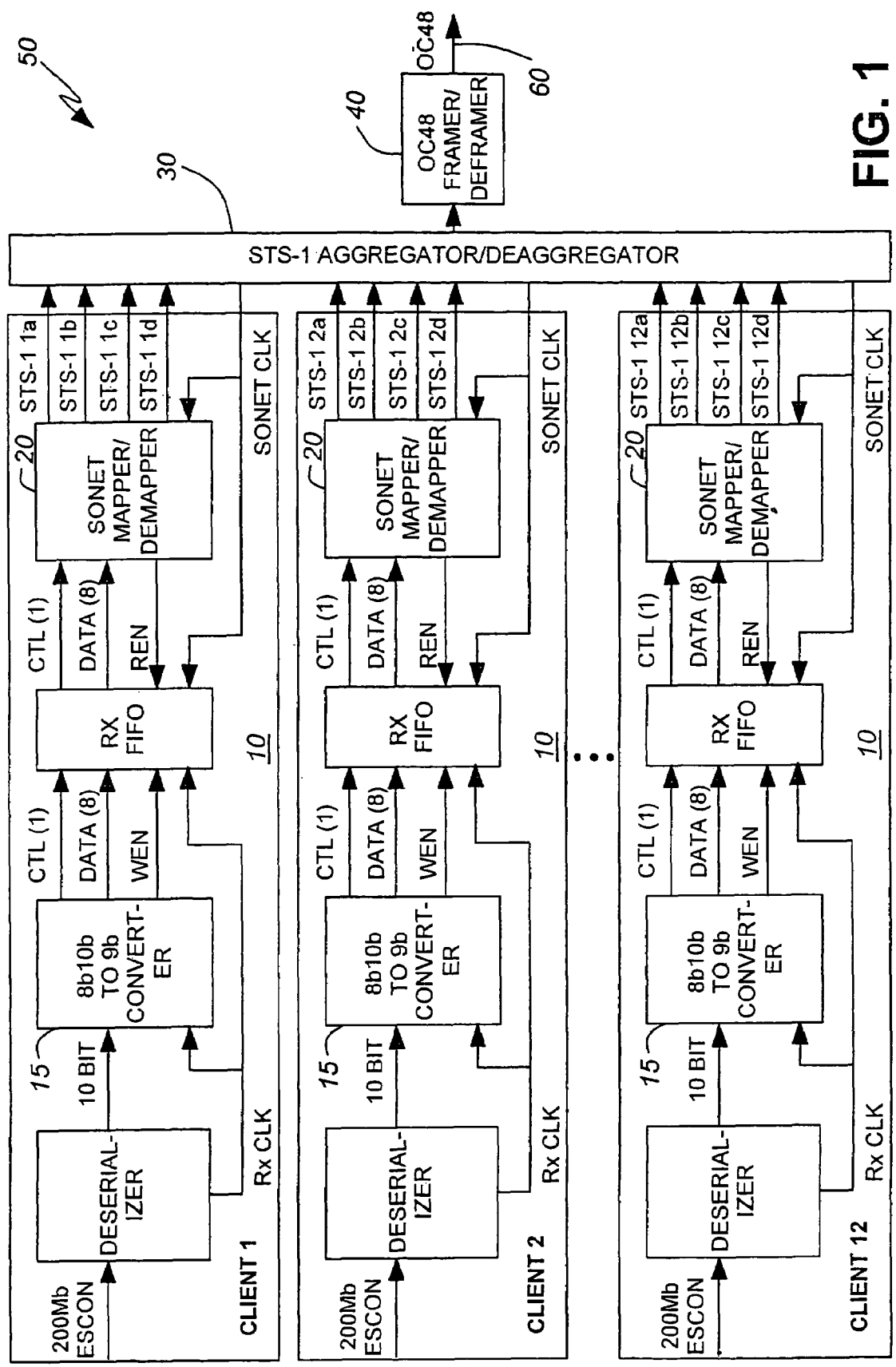
FIG. 1 is a functional block diagram of an optical data (i.e., ESCON) client transmitter having multiple (i.e., 12) serial-to-SONET conversion apparatuses which incorporate a SONET mapper in accordance with the invention.
Figure 2:
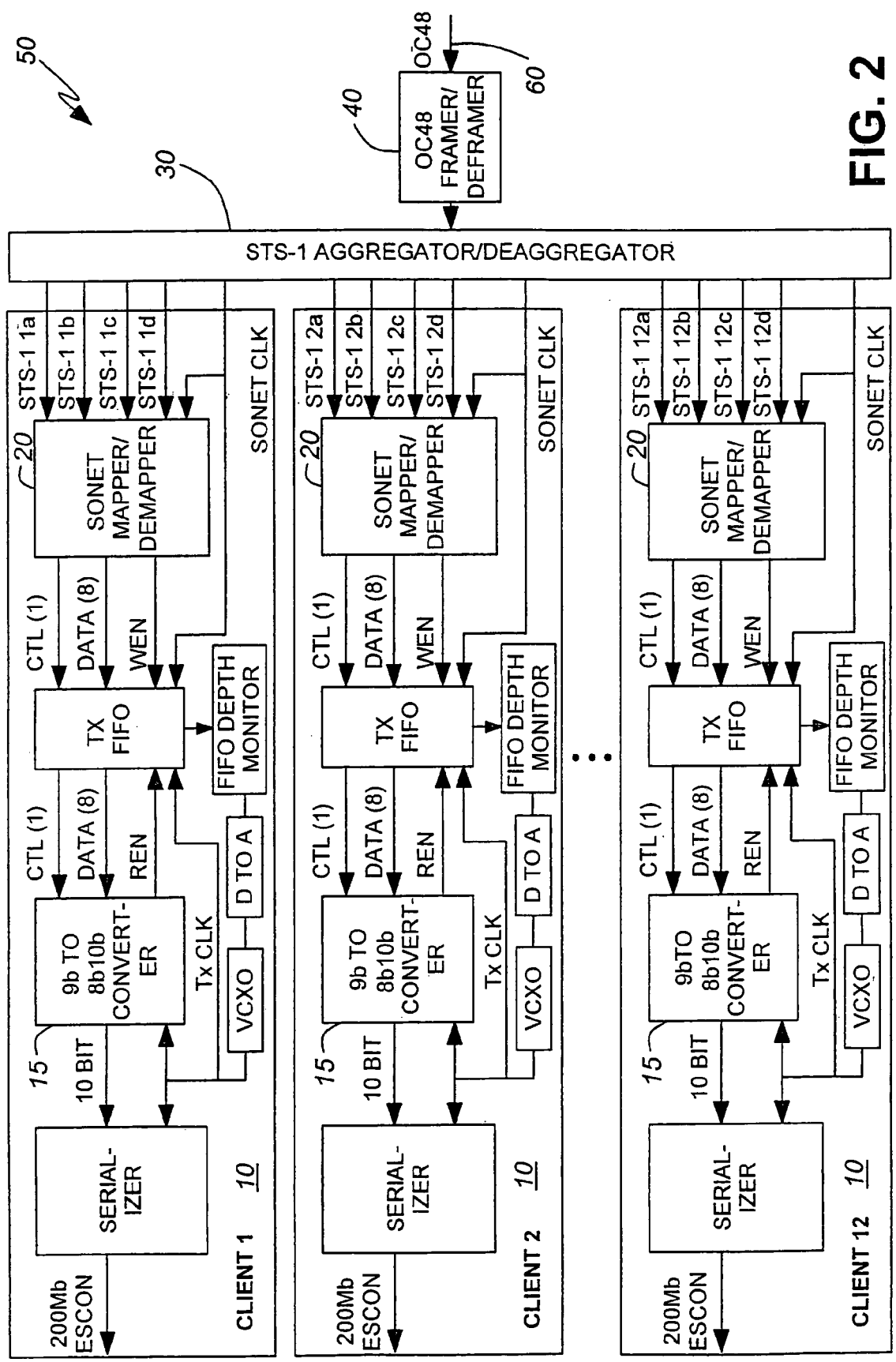
FIG. 2 is a functional block diagram of an optical data client receiver having multiple (i.e., 12) SONET-to-serial conversion apparatuses which incorporate a SONET demapper for performing the reverse of the mapper of FIG. 1 in accordance with the invention.

FIG. 1 of the drawings is a functional block diagram of an optical data (i.e., ESCON) client apparatus 50, showing its operation in a transmit mode from the client to the SONET network. FIG. 2 shows the operation of the same apparatus 50 in a receive mode from the SONET network to the client. The illustrated client apparatus 50 includes multiple (i.e., 12) serial-to-SONET conversion apparatuses 10 which connect to an aggregator/deaggregator 30 and then to an OC48 framer/deframer 40 which outputs and receives SONET frames.

In the transmit mode the mapper/demapper 20 performs a mapping algorithm and the aggregator/deaggregator 30 performs an aggregation algorithm whereas in the receive mode the mapper/demapper 20 performs a demapper algorithm (being the inverse of the mapper algorithm) and the aggregator/deaggregator 30 performs a deaggregation algorithm). (being the inverse of the aggregation algorithm).

Referring to FIG. 1, in the transmit mode a mapper component of the mapper/demapper 20 maps the client data into the SONET payload. This is done by means of a mapping module, applying a mapping algorithm, which allocates four STS-1's to a particular client (viz. client$_i$, where i=1-12 in this embodiment) based on the contents of a configuration memory (which is not addressed herein and is outside the scope of the invention claimed by this application). The aggregator 30 performs an aggregation of the client STS-1's into a composite STS-48 payload. The aggregate data stream is then fed into a standard SONET transmit framer 40 to insert section/line/path overhead information (data) and create a proper SONET frame. The parallel output from the framer 40 is then serialized and converted to an optical signal by a serializer/E-O converter (not shown) for transmission over an optical fibre 60.

Referring to FIG. 2, in the receive mode the received optical signal is converted back to an electrical signal and to parallel format by an O-E/deserializer converter (not shown) and then fed into the SONET deframer 40 where the section/line/path overhead data is extracted and processed. The resulting data stream is passed into the deaggregator 30 and then the mapper/demapper 20 which perform the inverse functions of those components in the transmit mode. Specifically, the deaggregator 30 receives the composite STS-48 payload from the SONET deframer and, based upon the local configuration memory (again, this aspect being beyond the scope of the invention claimed by this application), it then separates the composite STS stream into STS-1's according to the particular client they belong to (viz. client$_j$, where j=1-12 in this embodiment). The demapper 20 then takes the STS-1's assigned to a particular client and extracts the client information from it. As shown, the transmit clock generation circuitry (FIFO Depth Monitor, D to A and VCXO) is required to adapt the fill rate of the transmit FIFO to the ESCON transmit clock requirements.

A mapping module of the mapper/demapper 20 performs the mapping algorithm (method) of the present invention and is described in the following with reference to FIGS. 3(a) and (b), 4 and 5.

For purposes of instruction FIG. 3(a) is provided to show the full SONET STS frame format and FIG. 3(b) is provided to show the synchronous payload envelope (SPE) format of the SONET STS frame. As shown by FIG. 3(a), the full SONET STS frame is composed of octets positioned according to a grid of 9 rows by 90 columns. Of the 90 columns, 3 are used for transport overhead, leaving 87 available as the STS envelope capacity. Thus, of the total number of 810 frame octets, 27 are used for transport overhead, leaving 783 octets for STS envelope capacity. Within the STS envelope capacity is located the Synchronous Payload Envelope (SPE) which can have an arbitrary phase relationship to the STS frame. The start of the SPE is identified by a pointer in the overhead. As shown by FIG. 3(b), of the 87 columns available in the SPE one is used for path overhead and two are fixed stuff, leaving 84 columns comprising 756 octets available to carry payload. Therefore, an OC-n frame has n×756 octets to carry payload (so an OC48 frame has 48×756 octets available for payload).

The information characters input to the mapper/demapper 20 are 9-bit units since the client input ESCON line code has an 8b10b structure which is converted by the converter 15 to 8 bits of information, being the first 8 bits of the character, and 1 bit, being the $9^{th}$ bit of the character, identifying the type of that information (i.e., control or data type). Thus, an information character comprises an 8 bit value (which may be any value from 0-256) and one octet type bit which identifies that value type as either control or data. A mapping algorithm is applied by the mapper/demapper 20 to map each sequence of eight 9 bit characters input to the mapper to a sequence of nine octets of the SPE, wherein the first eight octets of the SPE correspond to the values of the eight characters and the ninth octet comprises the input octet type bit for each of those eight values to identify them as control or data values. The resulting SPE sequence is shown by FIG. 4.

Figure 4:
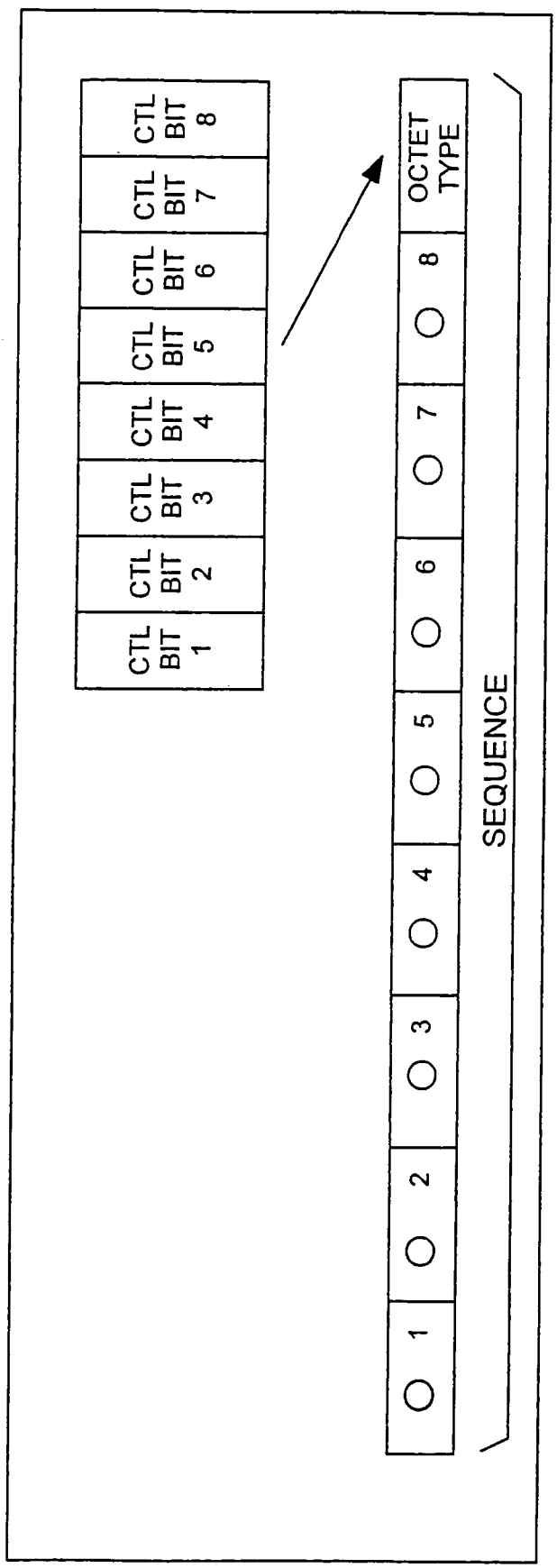

According to the mapping algorithm a first set of 8 character values carrying the 8 bit values of the input characters, shown as octets (bytes) labelled "O 1" to "O 8" in FIG. 4, are mapped sequentially to octets of the SPE. A $9^{th}$ octet (shown as the octet labelled "Octet Type" in FIG. 4) of the SPE carries each of the 8 bits for those mapped 8 character values which identify the type of octet (being either a control or data type octet). To map a sequence of 8 input characters to octets of the SPE the 8 information bits of the first character are placed in the next available SPE octet and then the same is done for each of the next seven input characters. The 8 octet type identification bits for the information characters so mapped are mapped to the 9th SPE octet in the sequence such that the octet type bit for the first mapped character value is placed in the first bit position of that 9th SPE octet, the octet type bit for the second mapped character value is placed in the second bit position of that 9th SPE octet, and so on until the octet type bit of the eighth mapped character value has been placed in the last bit position of that 9th SPE octet.

Figure 5:
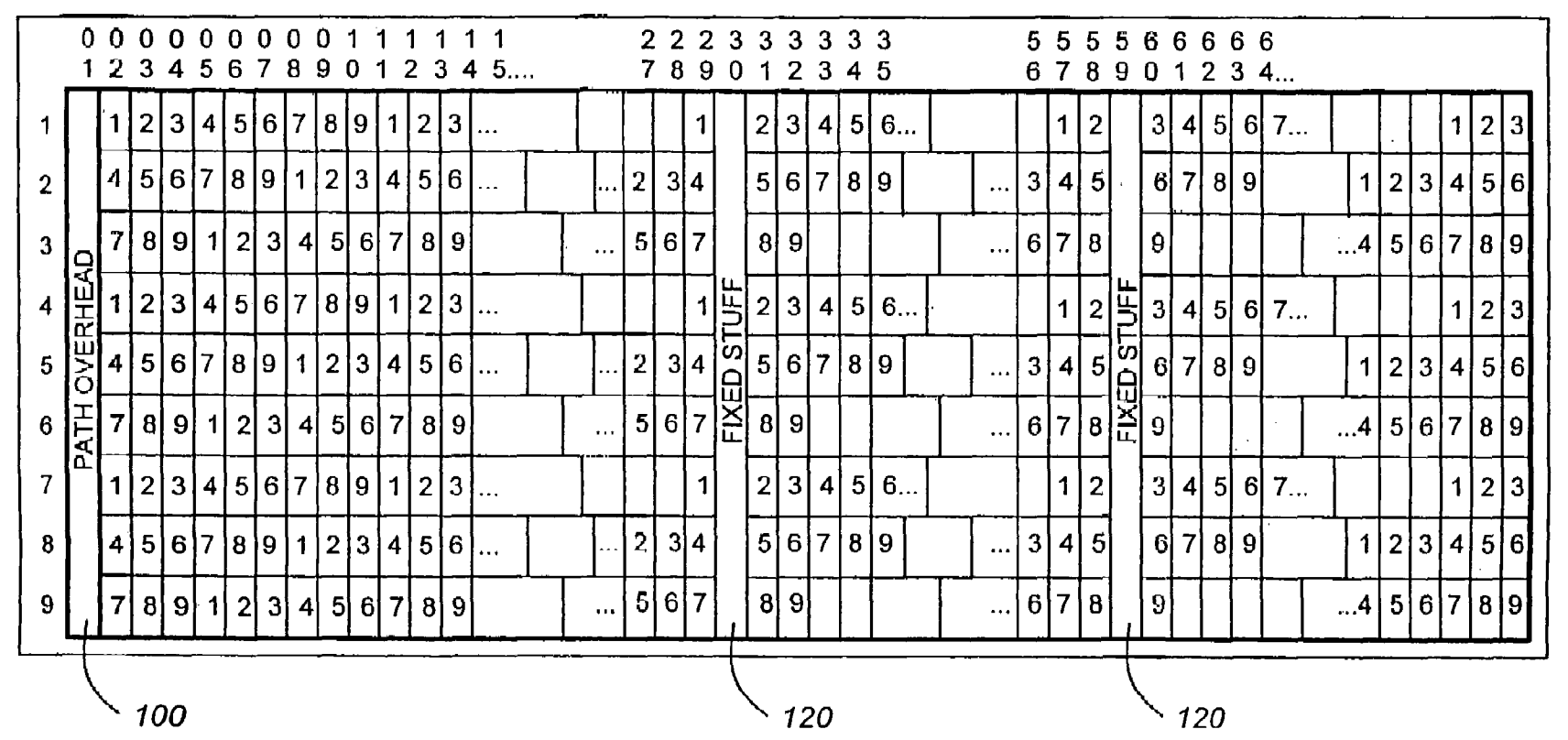

This same process is repeated for further input information characters but with a gapping over of the SPE overhead octets 100 and fixed stuff octets 120 until, as shown by FIG. 5, all octets of the SPE are filled such that each set of nine contiguous octets carry 8 9-bit input information characters (it is to be noted that the numbers appearing across the top of the SPE are to be read vertically, i.e., 01, 02, 03, etc. and, from left to right, run from 1-87). Conveniently, in this embodiment, because 9-bit information characters are mapped into the SONET frame and the SONET frame has 9 rows, an integer number of sequences of 9 contiguous octets can be placed into a SONET frame (this integer number being 84 in the STS-1 example shown by FIG. 5).

The SPE octet sequences mapped accordingly provide a means for mapping data character structures having octet type bits (identified as the "CTL" bit in FIGS. 1 and 2) that would not conform to the frame structure of the SONET frame if they were assigned to frame octets, as conventionally done, in a linear manner. This flexibility is provided by accumulating and grouping octet type bits into an Octet Type octet for each SPE octet sequence (per FIG. 4).

A demapping algorithm module, which is the inverse of the foregoing mapping algorithm module, is applied by the mapper/demapper 20 to extract, from each sequence of 9 octets of the SPE, the 9 bits for each of the eight data characters carried thereby. According to the demapping algorithm, for each 9 octet sequence of an SPE the first eight octets are extracted (these being "O 1" to "O 8" in the sequence of FIG. 4) and temporarily held. Then the octet type bits making up the 9th octet, being the "Octet Type" octet of the sequence, are allocated to their respective extracted information octets to form the eight 9-bit information characters.

Although the example shown by FIG. 5 is one STS-1 only the mapping algorithm applied by the mapper, and the corresponding demapping algorithm applied by the demapper, are not limited to any SONET frame rate. As will be readily understood by one skilled in the art any STS-n (e.g., STS-48) mapping may be applied in the same manner.

Advantageously, the mapper of the present invention establishes a deterministic bandwidth for transport of information (in doing so, though, it consumes ⅑th of the available bandwidth to carry data type indicators). Also advantageously, the mapper provides a level of flexibility which enables up to 256 data and 256 control values to be carried within the same SPE (i.e., since the value of each 8 bit octet is from 0-256 and the $9^{th}$ bit associated therewith identifies that value as being either data or control).

Importantly, the mapper of the present invention allows link extension across a SONET network at the physical signalling layer thereby eliminating the complexity and associated cost which would commonly be required to process the data at higher layers in the protocol stack prior to the transmission and then at the reception of the data on a SONET link.

The terms algorithm, module and component herein refer to software and/or hardware means of implementation of the methods described herein without limitation to any specific configuration or operating means.

The individual electronic and processing functions utilised in the foregoing described preferred embodiment are, individually, well understood by those skilled in the art. It is to be understood by the reader that other implementations may be devised by skilled persons for substitution while still remaining within the scope of the invention. Persons skilled in the field of communication design will be readily able to apply the present invention to an appropriate implementation for a given application.

It is to be understood that the particular embodiment shown and described herein by way of illustration is not intended to limit the scope of the invention which is defined by the appended claims.

The invention claimed is:

1. A method of mapping input data words into a synchronous payload envelope (SPE) wherein the input data words include information that may be either control or data information and wherein the input data words also include at least one type bit identifying the input data word type as control or data information, the method comprising:

mapping the information that may be either control or data information from a plurality (M) of input data words to a contiguous sequence of M+1 words in the SPE; and mapping each of the M at least one type bit identifying the input data word from the plurality of input data words to the contiguous sequence of M+1 words in the SPE such that the M at least one type bits are consolidated into a single word of the contiguous sequence;

wherein said mapping step maps each of the M at least one type bit identifying the input data word from the plurality of input data words to the contiguous sequence of M+1 words such that the type bits are mapped to bit positions which correspond to positions of the corresponding input data words in an input sequence.

2. The method of claim 1, wherein M is equal to 8, the input data words are each 9 bit words, and the information in the input data words are octets that are either a control octet or a data octet.

3. The method of claim 2, wherein the input data words have an 8b10b data structure.

4. The method of claim 1, said mapping step maps each of the M at least one type bit identifying the input data word from the plurality of input data words to the contiguous sequence of M+1 words such that the M at least one bits occupy an (M+1)-th position of the contiguous sequence.

5. The method of claim 1, wherein the SPE is an SPE of a SONET frame.

6. The method of claim 5, wherein the input data words are mapped to an SPE comprising four STS-1's.

7. A method of demapping data words from a synchronous payload envelope (SPE) to form output data words that include information that may be either control or data information and wherein the output data words also include at least one type bit identifying the output data word type as control or data information, the method comprising:

demapping M words of information that may be either control or data information from a contiguous sequence of M+1 words in the SPE to plurality (M) of the output data words; and demapping a remaining word from the contiguous sequence of M+1 words in the SPE and distributing bits of the remaining word to the output data words such that the distributed bits are in a predetermined position of the output data word that serves as the at least one type bit identifying the output data word as control or data information wherein the type bits are mapped to bit positions which correspond to positions of the corresponding input data words in an input sequence.

8. The method of claim 7, wherein M is equal to 8, the output data words are each 9 bit words, and the information in the output data words are octets that are either a control octet or a data octet.

9. The method of claim 8, wherein the output data words have an 8b10b data structure.

10. The method of claim 7, said demapping step demaps the remaining word from an (M+1)-th position of the contiguous sequence.

11. The method of claim 7, wherein the SPE is an SPE of a SONET frame.

12. The method of claim 11, wherein the output data words are demapped from an SPE comprising four STS-1's.

* * * * *